Aug. 14, 1962 W. BRUCH 3,049,640
SELF REGULATING DEFLECTION CIRCUITS
Filed Nov. 3, 1958

Inventor:
Walter Bruch

United States Patent Office 3,049,640
Patented Aug. 14, 1962

3,049,640
SELF REGULATING DEFLECTION CIRCUITS
Walter Bruch, Hannover, Germany, assignor to
Telefunken G.m.b.H., Berlin, Germany
Filed Nov. 3, 1958, Ser. No. 771,648
Claims priority, application Germany Nov. 6, 1957
4 Claims. (Cl. 315—27)

The present invention relates to improvements in deflection circuits, such as those employed in television receivers.

It has been known to provide a circuit arrangement for generating a saw-tooth current wave in an inductance in which, during the saw-tooth sweep, a voltage across a condenser is applied to the inductance via a switching diode while, during the return trace when the switching diode is blocked, the inductance with the connected capacity carries out a free half-cycle oscillation, wherein a controlled driver tube is connected to the inductance for the purpose of replacing the energy losses of the circuit and to control the switching diode. Such circuits in various modifications have been employed as horizontal deflection means, wherein the mentioned inductance is represented by a transformer to which the line deflection coils are coupled. In most cases, a D.C. voltage between 12 and 20 kv. is produced by the high voltage peaks occurring during the line return trace by means of a rectifier connected to a special winding of the transformer, said D.C. voltage being used as the acceleration voltage for the picture tube of a television receiver.

If a pentode is used as the driver tube, and if the pentode is operated in the range of high internal resistance, care has to be taken in such circuits that the shape and amplitude of the saw-tooth control voltage is exactly matched to the tube characteristics which causes trouble in the event of tube exchange. In the range of high internal resistance, the mean tube current of the pentode is independent of the anode voltage, whereby, due to the great differences in the individual tube characteristics, the mean tube current may considerably vary in case of tube exchange.

It has been known to stabilize the deflection amplitude, i.e., to stabilize the operating point of the driver tube, by deriving a D.C. voltage from the voltage appearing across the inductance of the transformer during the saw-tooth return trace in the range of high internal resistance, while avoiding the afore-mentioned disadvantages, and to apply said D.C. voltage to the driver tube as a biasing voltage. As a result of this, the driver tube can be operated in the range of high internal resistance to avoid Barkhausen-Kurz oscillations, so that the deflection amplitude is stabilized and the high voltage source exhibits a low internal resistance. The negative bias voltage at the driver tube also causes the control voltage source for the driver tube, which is generally in the form of a blocking oscillator, not to be loaded by the grid current of the driver tube and, therefore, no undesirable deformations of the current-voltage curve are obtained which would, otherwise, readily occur at the end of the saw-tooth sweep.

It is an object of the present invention to provide means to amplify the control voltage variations occurring in the aforementioned circuit.

It is another object of the invention to provide as load resistance of the rectifier a series circuit comprising a resistor and at least one glow-lamp and to derive this D.C. control voltage from said resistance.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Figure 1:
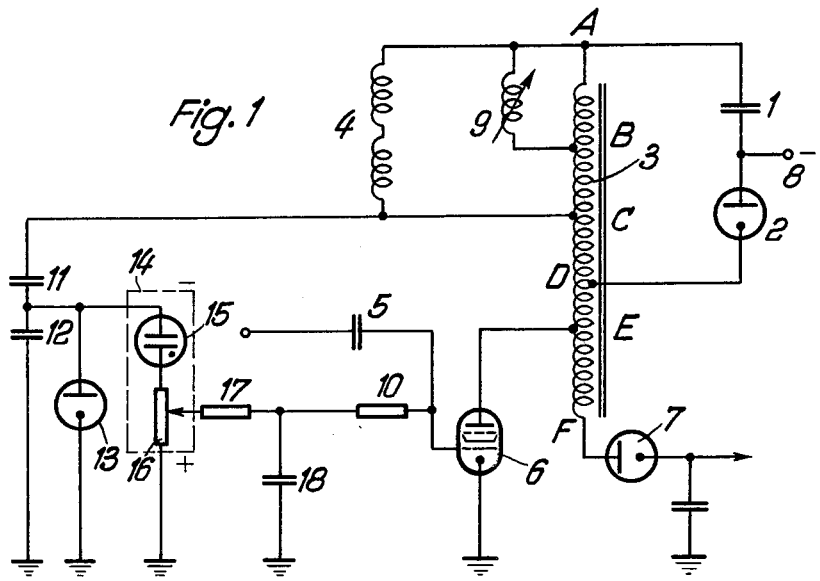
FIGURE 1 shows schematically an application of the invention to a so-called Blümlein line deflection circuit of a television receiver (see Andrieu, Telefunken-Zeitung, volume 25, No. 95, of June 1952, pages 107 to 114).

In FIGURE 1, an approximately constant voltage is applied to a part of the winding of a deflection transformer 3 between points A and D by means of a condenser 1 and a switching diode 2 which is non-conductive during the saw-tooth sweep. The term "approximately constant" voltage is to be understood to be a constant D.C. voltage on which is superimposed, if necessary, a parabolic voltage component for the purpose of compensating the so-called tangent error occurring in cathode ray tubes with a flat luminescent screen. The voltage curve at the deflection coil of the circuit according to FIGURE 1 actually represents a portion of a sine curve during the sweep, so that, by suitable selection of the portion of this sine curve, the proper deviation from the constant voltage curve can be adjusted to compensate for the tangent error. This approximately constant voltage can be transmitted to deflection coils 4 by means of the transformer 3, which coils are inserted between the point A having no, or only a very low, A.C. voltage and a tap C of the transformer having a higher A.C. voltage. The energy losses of this circuit are made up by the driver tube 6 during the saw-tooth sweep, said driver tube being connected to a point E of the deflection transformer 3. In this circuit, the tube 6 has to supply such current that the switching diode 2 is open during the entire sweep. The tube 6 is always blocked at the end of a saw-tooth sweep, due to a voltage characteristic or curve synchronized with the received synchronizing pulses, said curve being conventionally generated, for example, by a blocking oscillator (not shown) and being fed to the control electrode, i.e., the grid of the tube 6 with negatively directed pulses via the condenser 5. As a result of this, the switching diode 2 is simultaneously blocked. The deflection coil 4 with the connected deflection transformer 3 and the switching capacities transformed thereto then carries out a free half-cycle oscillation blocking the diode and opening it after its completion. As a result of this, the approximately constant voltage is applied again to the deflection coil 4, so that the saw-tooth sweep is renewed. The voltage peaks occurring during the saw-tooth return trace are transformed upwardly in the part of the winding of the transformer between the points E and F and these voltage peaks are fed to a rectifier 7 in which they serve to produce a high voltage of, for example, 12 to 15 kv. for accelerating the beam in the picture tube.

The anode voltage source for the driver tube 6 is connected at 8 to the junction point of the condenser 1 with the anode of the diode 2 in a manner known per se.

An adjustable shunt inductance 9 inserted between the points A and B of the transformer 3 is provided for controlling the deflection current amplitude in the deflection coils 4. Alternatively, any other amplitude control may be employed, for example, an inductance or a rheostat connected in series with the deflection coils 4.

The circuit described so far has been known. The energy loss $N_V$ of the circuit is proportional to the square of the voltage across a part of the winding of the transformer during the saw-tooth sweep, for example, proportional to a voltage U between the points D and E: $N_V = K \cdot U^2$, wherein K is a constant determined by the losses. This energy loss is made up by the tube 6. The energy $N_R$ generated equals the product of the voltage U and the mean tube current $I_{Rm}$. Since $N_V$ equals $N_R$ in the state of equilibrium, there is obtained $$K \cdot U = I_{Rm} \text{ or } U = \frac{I_{Rm}}{K}$$

From this, it can be seen that, with a variation of K, for example, due to change of the deflection current amplitude in the inductance 9, or due to change in the load of the high voltage rectifier tube 7, in case of change of the brightness of the picture, $I_{Rm}$ has to change in the same way if U is to remain constant. The variations of U are compensated in a manner known per se by supplying a bias voltage, depending upon the return sweep amplitude, to the grid of the tube 6 via the resistance 10. For this purpose, the anode of a rectifier 13 having a grounded cathode is connected to a suitable tap of the transformer 3, such as the tap C of the deflection coil 4, via a capacitive voltage divider comprising condensers 11 and 12. A load 14 is inserted between the anode of the rectifier 13 and ground, whereby a D.C. voltage is obtained across this load corresponding to the peak amplitude of the return trace voltage supplied, as indicated by plus and minus signs shown near the load 14. This load 14 is resistive and comprises a series circuit of a glow lamp 15 and a resistance 16 which, as shown, is designed as a potentiometer, from the tap of which the bias voltage for the tube 6 is derived via a smoothing network comprising a resistance 17 and a condenser 18. As shown in the drawing, the resistance 16 is grounded, whereby it is connected to the grounded cathode, constituting the reference electrode, of the driver tube 6. If the voltage U across the points D and E of the transformer 3 is decreased, due to increase in the losses, the amplitude of the return trace voltage and, thereby, the negative bias voltage of the tube 6 across the load 14, are decreased, so that the average tube current $I_{Rm}$ is increased to cause compensation. To increase the precision of the control, i.e., the dependence of the bias voltage upon the load variations, a positive bias voltage source can be inserted in the cathode line of the diode 13.

The glow discharge tube 15 together with the resistance 16 serves to divide the relatively high voltage of, for example, 200 volts rectified by the diode 13 in such a manner, that a voltage of, for example, 100 volts, appears at the tap of the resistance 16 and, therefore, can maintain constant the subtraction of 100 volts in such a manner, that the full amount of the variation appears across the resistance 16 when the control voltage varies. A relatively great change in the control voltage on the control grid of the driver tube can be obtained with a correspondingly high voltage drop across the glow lamp or, in case of a series circuit of several glow lamps and proper selection of a tap on the transformer 3, effecting considerably the control voltage, because voltages up to several thousand volts are available on the line deflection transformer. If the voltage is varied 10%, a voltage change of 10 volts would be obtained without application of the system according to the invention in case of a tap causing a control voltage of about 100 volts at the output of the diode. If the tap on the transformer is changed in such a manner that the output voltage of the diode amounts, for example, to 200 volts, and if the voltage dividing circuit comprising the glow lamp and potentiometer is designed in such manner, that the same voltage as in the first example, 100 volts, appears across the potentiometer, the entire amount of this variation will act on the potentiometer in case of a voltage change of 10%, i.e., of 20 volts, because the glow lamp subtracts a constant voltage.

Figure 2:
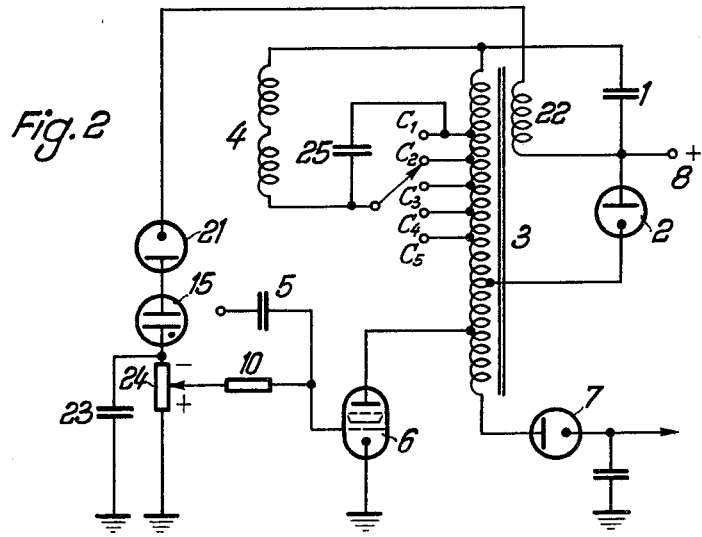
FIGURE 2 shows a modified form of the invention.

FIGURE 2 shows another embodiment of the invention in which components similar to the basic circuit of FIGURE 1 bear the same reference characters. The control of the deflection current amplitude is effected in this embodiment by a change of the number of turns tapped by the deflection coil 4 on the transformer 3 by means of a plurality of selectable taps $C_1$, $C_2$, $C_3$, $C_4$ and $C_5$.

A condenser 25 is inserted between the variable tap and $C_1$ in order to maintain the return trace time constant when the tap is varied for amplitude adjustment. The cathode of the diode 21, serving to obtain the control bias voltage for the tube 6, is connected to a special winding 22 of the deflection transformer, said winding being isolated from the main winding with respect to D.C. voltage and being connected at its other end to a battery terminal 8. The positive bias voltage obtained thereby blocks the diode 21 for all of the negative voltage peaks which are lower than the battery voltage of, for example, 230 volts. Voltage peaks are induced in the winding 22 by the return trace voltage peaks and are rectified in the diode 21 and delivered at a magnitude by which its amplitude exceeds the battery voltage. As a result of this, a negative voltage is obtained across the anode resistance 24 which is in series with the glow lamp and is shunted by a condenser 23, the value of this negative voltage being proportional to the mentioned voltage difference and said voltage being fed as bias voltage to the grid of the tube 6 via the resistance 10. The resistance 24 is likewise suitably designed as potentiometer, so that the bias voltage can be adjusted.

The glow lamp 15 is suitably arranged in such a manner that it is simultaneously used as an indicator for indicating the operative condition, wherein the glow lamp is lighted only when the line deflection is operating.

I claim:

1. A sweep circuit for generating and delivering sawtooth sweep waves to deflection coils comprising a transformer; diode controlled sweep-generating means connecting said transformer to a source of D.C. power; a driver tube connected with said transformer and controlling the flow of power thereto via the diode means to make up power dissipated in and delivered by the transformer, said driver tube having a reference electrode and a control electrode; rectifier means connected to said transformer and rectifying a portion of the current therein to obtain a bias potential having superimposed thereon variations in the operating level of the transformer, said rectifying means being connected to a relatively high-potential point of the transformer whereat said variations will be large; and a load across said rectifier means comprising gas-filled glow lamp means connected to the rectifier means and a resistance connected to the glow lamp means and to the reference electrode of the driver tube, and said resistance having a point connected to the control electrode of the tube to apply a component of said variation in potential to the last-mentioned electrode to alter the operating point of the driver tube and cancel out said variations in the transformer, the glow lamp means subtracting a constant voltage from the output of the rectifier means to permit the full variation in potential to appear across the resistance.

2. In a circuit as set forth in claim 1, said glow lamp means serving simultaneously to indicate the operation of the sweep circuit.

3. In a circuit as set forth in claim 1, a reverse D.C. bias being applied to said rectifier means and blocking the passage therethrough of the transformer current except for such current peaks which exceed said D.C. bias.

4. In a circuit as set forth in claim 3, said rectifier means being connected to said D.C. power source and biased thereby against passage of transformer current not exceeding in amplitude the amplitude of said D.C. source.

References Cited in the file of this patent

UNITED STATES PATENTS

| | | |
|---|---|---|
| 2,059,219 | Farnsworth | Nov. 3, 1936 |
| 2,369,631 | Zanarini | Feb. 13, 1945 |
| 2,403,510 | Eaton | July 9, 1946 |
| 2,566,762 | English | Sept. 4, 1951 |
| 2,667,614 | Covill | Jan. 26, 1954 |
| 2,832,003 | Andrien | Apr. 22, 1958 |